(12) United States Patent
Hwang et al.

(10) Patent No.: US 7,688,579 B2
(45) Date of Patent: Mar. 30, 2010

(54) PORTABLE ELECTRONIC DEVICE INCORPORATING THERMAL MODULE

(75) Inventors: Ching-Bai Hwang, Taipei Hsien (TW); Zhi-Hui Zhao, Shenzhen (CN); Ran Lin, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/235,607

(22) Filed: Sep. 23, 2008

(65) Prior Publication Data

US 2009/0268393 A1    Oct. 29, 2009

(30) Foreign Application Priority Data

Apr. 28, 2008    (CN) .................... 2008 1 0066873

(51) Int. Cl.
```
H05K 7/20      (2006.01)
F28D 15/00     (2006.01)
F28F 3/02      (2006.01)
F04D 29/42     (2006.01)
F01D 25/00     (2006.01)
F03B 3/12      (2006.01)
F01D 5/22      (2006.01)
```

(52) U.S. Cl. .................... 361/679.52; 165/104.33; 165/121; 361/679.48; 361/695; 361/700; 415/203; 415/213.1; 416/178; 416/179

(58) Field of Classification Search ................. 361/700; 416/178, 186 R, 187, 188
See application file for complete search history.

(56) References Cited

U.S. PATENT DOCUMENTS

| | | | |
|---|---|---|---|
| 6,781,835 B2 * | 8/2004 | Hashimoto et al. | 361/697 |
| 6,900,990 B2 * | 5/2005 | Tomioka | 361/752 |
| 6,924,978 B2 * | 8/2005 | DiStefano | 361/688 |
| 7,255,532 B2 * | 8/2007 | Zheng | 415/183 |
| 7,317,614 B2 * | 1/2008 | Ruch et al. | 361/679.48 |
| 7,405,930 B2 * | 7/2008 | Hongo et al. | 361/679.48 |
| 7,492,587 B2 * | 2/2009 | Chang | 361/679.44 |
| 2003/0223864 A1 * | 12/2003 | Horng et al. | 415/203 |
| 2004/0001316 A1 * | 1/2004 | Kamikawa et al. | 361/700 |
| 2004/0105233 A1 * | 6/2004 | Lai | 361/695 |
| 2007/0251676 A1 * | 11/2007 | Cheng et al. | 165/104.33 |
| 2008/0043436 A1 | 2/2008 | Hung et al. | |
| 2008/0075598 A1 * | 3/2008 | Chen et al. | 416/179 |
| 2008/0151500 A1 * | 6/2008 | Liang et al. | 361/697 |

* cited by examiner

*Primary Examiner*—Gregory D Thompson
(74) *Attorney, Agent, or Firm*—Frank R. Niranjan

(57) ABSTRACT

A portable electronic device includes a casing, an electronic component disposed in the casing, and a thermal module for dissipating heat of the electronic component. The thermal module includes a heat pipe, a fin unit, and a transverse fan. The heat pipe includes an evaporating section thermally attached to the electronic component, and a condensing section thermally attached to the fin unit. The transverse fan is arranged in the casing for generating an airflow through the electronic component and the fin unit. The transverse fan includes a rotor, and a sidewall on a floor of the casing and surrounding the rotor. The sidewall defines an air inlet and an air outlet therein. The air outlet faces to the fin unit. The air inlet faces to the electronic component.

20 Claims, 3 Drawing Sheets

PORTABLE ELECTRONIC DEVICE INCORPORATING THERMAL MODULE

BACKGROUND

1. Field of the Disclosure

The disclosure generally relates to a portable electronic device, and particularly to a thermal module of the portable electronic device.

2. Description of Related Art

With the continuing development of electronic technology, processors of the electronic devices have become faster and faster, which causes the processors to generate more redundant heat. Thermal modules are traditionally disposed in the electronic devices to help transfer of the heat from the processors to an outside, thus to maintain a stability and normal performance of the electronic devices.

Generally the thermal module includes a fin unit thermally attached to the processor to absorb heat therefrom, and a centrifugal blower for generating airflow to take away the heat of the fin unit. The centrifugal blower defines air inlet/inlets at top side or/and bottom side thereof, and defines an air outlet at a lateral side adjacent to the fin unit. A gap is defined between a casing of the electronic device and the top side/bottom side of the centrifugal blower for the airflow flowing into the centrifugal blower smoothly. However, the gaps between the casing and the centrifugal fan increase a thickness of the electronic device, which conflicts with the requirement of lightness, thinness, compactness and minimization of the portable electronic devices.

For the foregoing reasons, therefore, there is a need in the art for a portable electronic device with a thermal module which overcomes the above-mentioned problems.

SUMMARY

According to an exemplary embodiment, a portable electronic device includes a casing defining a space therein, an electronic component disposed in the space of the casing, and a thermal module for dissipating heat of the electronic component. The thermal module includes a heat pipe, a fin unit, and a transverse fan. The heat pipe includes an evaporating section thermally attached to the electronic component to absorb heat therefrom during operation of the electronic component, and a condensing section thermally attached to the fin unit to dissipate the heat absorbed from the electronic component to the fin unit. The transverse fan is arranged in the casing for generating an airflow to take away the heat of the fin unit. The transverse fan is located between the electronic component and the fin unit. The transverse fan includes a rotor, and a cover abutting a roof of the casing and a sidewall extending downwardly from a periphery of the sidewall to abut a floor of the casing and surround the rotor. The rotor is received in a space between the cover and the sidewall. The sidewall defines an air inlet and an air outlet therein. The air outlet faces to the fin unit. The air inlet faces to the electronic component.

Other advantages and novel features of the disclosure will be drawn from the following detailed description of the exemplary embodiments of the disclosure with attached drawings.

DETAILED DESCRIPTION OF THE EMBODIMENTS

Figure 1:
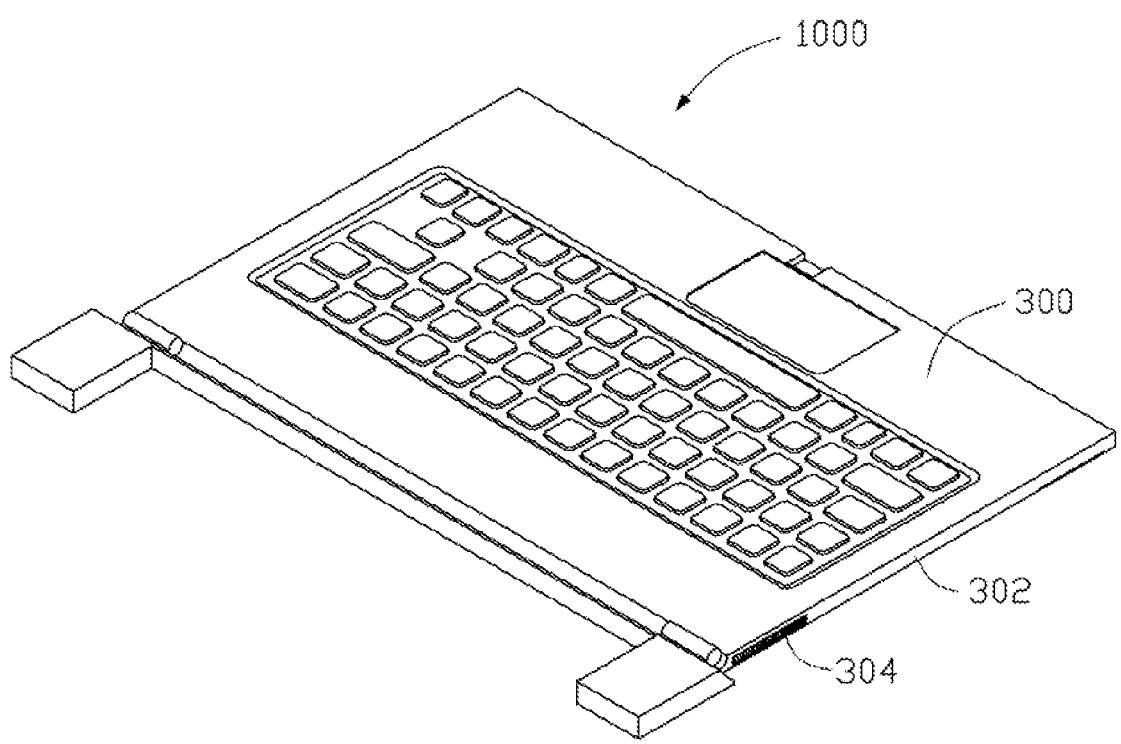
FIG. 1 is an assembled view of a portable electronic device according to an exemplary embodiment.

Referring to FIG. 1, a portable electronic device according to an exemplary embodiment is shown. The portable electronic device can be a notebook computer, or a portable DVD player. FIG. 1 shows a chassis including a keyboard of the portable electronic device. A display panel which is pivotably connected to the chassis is not shown.

Figure 2:
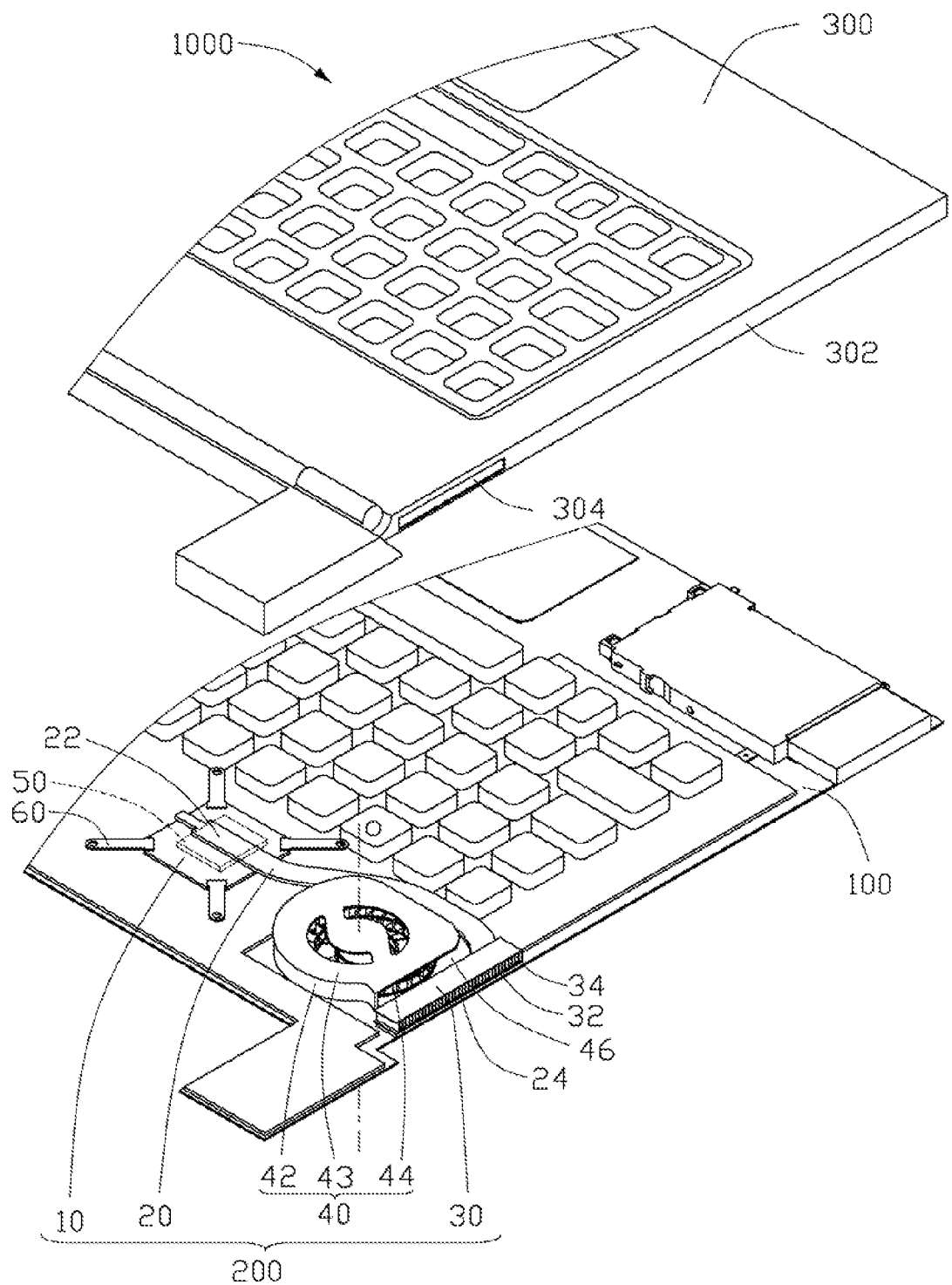
FIG. 2 is an enlarged, exploded view of a part of the portable electronic device of FIG. 1.

Referring to FIG. 2, the chassis of the portable electronic device includes a casing 1000 receiving an electronic component 50, such as CPU therein, and a thermal module 200 thermally connected to the electronic component 50 to transfer heat generated by the electronic component 50 to an outside of the portable electronic device. The casing 1000 includes a floor 100, a roof 300 parallel to the floor 100, and a flange 302 extending downwardly from an outer periphery of the roof 300 to the floor 100. A space is thus defined among the floor 100, the roof 300 and the flange 302 for receiving the electronic component 50 and the thermal module 200 therein. A plurality of ventilation holes 304 are defined in the flange 302 of the casing 1000 corresponding to a position of the thermal module 200.

The thermal module 200 includes a heat spreader 10, a heat pipe 20, a fin unit 30, and a transverse fan 40. The heat spreader 10 is mounted on the electronic component 50 via four resilient legs 60. A bottom surface of the heat spreader 10 is thermally attached to the electronic component 50. The fin unit 30 includes a plurality of fins 32 parallel to each other. The fins 32 are approximately perpendicular to the floor 100 of the casing 1000. A channel 34 is defined between each two neighboring fins 32. The heat pipe 20 includes an evaporating section 22 thermally arranged on a top surface of the heat spreader 10, and a condensing section 24 thermally attached to the fin unit 30, and thus to transfer heat from the heat spreader 10 to the fin unit 30.

Figure 3:
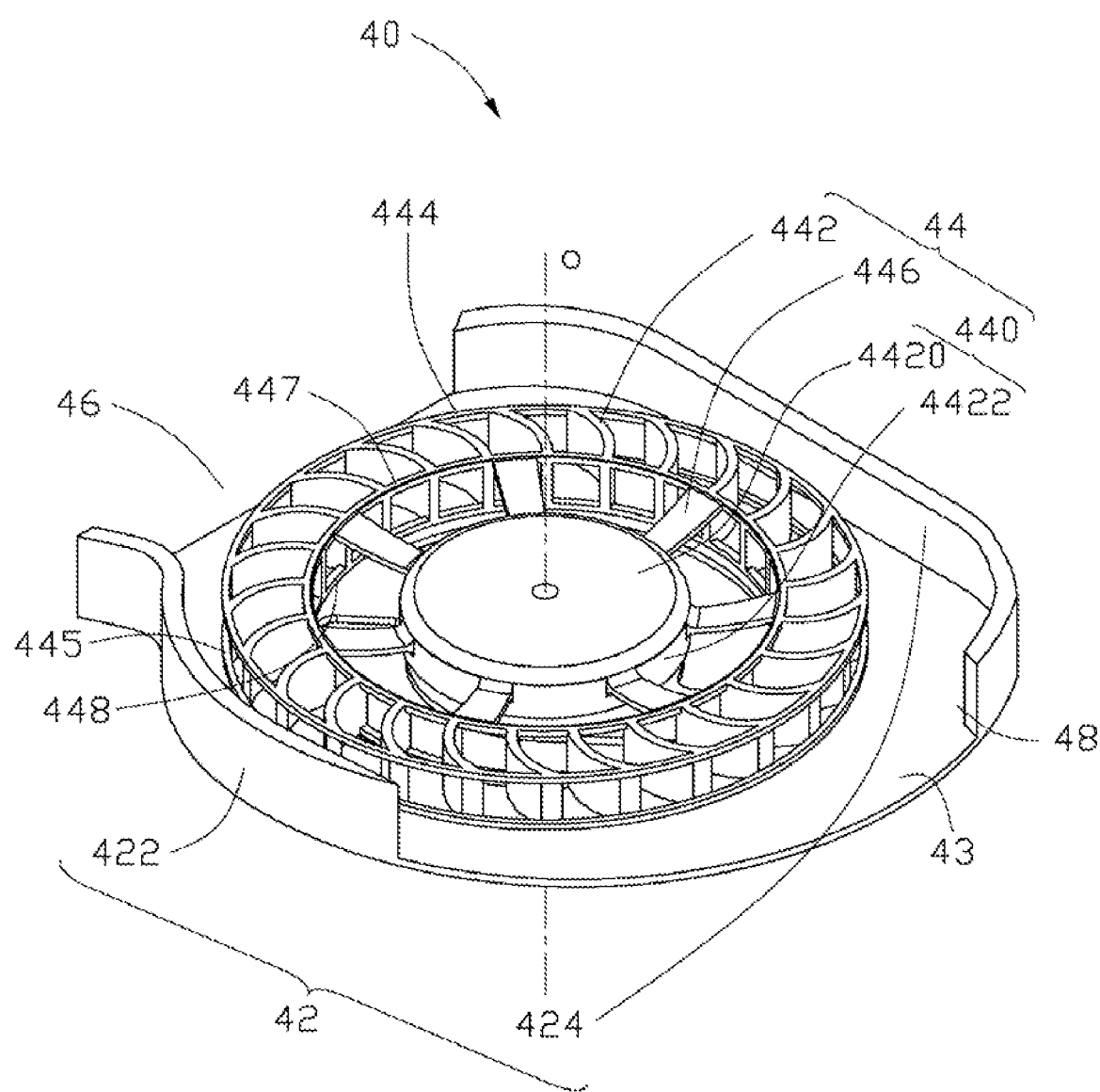
FIG. 3 is perspective view of a transverse fan of the portable electronic device viewed from a bottom side thereof.

Referring to FIG. 3 at the same time, the transverse fan 40 is arranged on the floor 100 of the casing 1000, and located between the heat spreader 10 and the fin unit 30. A central axis o of the transverse fan 40 is perpendicular to the floor 100 of the casing 1000. The transverse fan 40 includes a rotor 44, a sidewall 42 surrounding the rotor 44, and a cover 43. The sidewall 42 extends perpendicularly from the floor 100 of the casing 1000, and the cover 43 is arranged on a top end of the sidewall 42. After assembled into the casing 1000, the cover 43 of the transverse fan 40 abuts the roof 300 of the casing 1000. In other words, there is no space between the cover 43 and the roof 300. An air inlet 48 is defined in the sidewall 42 adjacent to the electronic component 50, and an air outlet 46 is defined in the sidewall 42 adjacent to the fin unit 30. The air inlet 48 and the air outlet 46 extend through the sidewall 42, and thus dividing the sidewall 42 into two spaced parts 422, 424. The air inlet 48 and the air outlet 46 are substantially parallel to each other, and are substantially perpendicular to the channels 34 of the fin unit 30. The fin unit 30 is arranged between the air outlet 46 of the sidewall 42 and the ventilation holes 304 of the flange 302 of the casing 1000, with the channels 34 communicating with the air outlet 46 and the ventilation holes 304.

The rotor 44 is supported by the cover 43. The rotor 44 includes a hub 440, and a plurality of blades 442 surrounding the hub 440. The blades 442 are evenly spaced from each other along a circumferential direction of the rotor 44. Each blade 442 is curved. Outer ends of the blades 442 are spaced from the sidewall 42. A first outer ring 444 connects bottom sides of the outer ends of the blades 442 together, and a second outer ring 445 connects top sides of the outer ends of the blades 442 together. A first inner ring 447 connects bottom sides of the inner ends of the blades 442 together, and a second inner ring 448 connects top sides of the inner ends of the blades 442 together. Thus each blade 442 is fixedly connected to the four rings 444, 445, 447, 448. The hub 440 is cylindrical-shaped, and is arranged in a center of the blades 442. The hub 440 includes a circular base 4420 and a cylinder 4422 extending perpendicularly from an outer periphery of the base 4420. A plurality of ribs 446 extend radially and outwardly from the cylinder 4422 of the hub 440 to connect with the first inner ring 447, and thus to connect the blades 442 to the hub 440.

During operation, heat generated by the electronic component 50 is transferred to the heat spreader 10, and then absorbed by working fluid in the evaporating section 22 of the heat pipe 20. The working fluid evaporates to vapor and moves toward the condensing section 24 of the heat pipe 20 due to the difference of vapor pressure to perform heat transport. Then the vapor dissipates the heat to the fin unit 30, and condenses at the condensing section 24 of the heat pipe 20 and finally flows back to the evaporating section 22 of the heat pipe 20 via a wicking action of the heat pipe 20 to absorb heat again. Thus the heat of the electronic component 50 is transferred to the fin unit 30 by the heat pipe 20. At the same time, the rotor 44 of the transverse fan 40 rotates to generate forced airflow. The airflow flows through the channels 34 of the fin unit 30 to take away the heat of the fin unit 30, and finally flows to the outside of the portable electronic device through the ventilation holes 304. Thus the heat of the electronic component 50 is dissipated to the outside of the portable electronic device. Since the air inlet 48 and the air outlet 46 are defined in the sidewall 42 of the transverse fan 40, the transverse fan 40 can abut both the floor 100 and the roof 300 of the casing 1000 directly. Thus there is no gap between the transverse fan 40 and the floor 100 and the roof 300 of the casing 1000. A thickness of the portable electronic device can be reduced, which is convenient for carrying of a user. In addition, the air inlet 48 and the air outlet 46 are approximately perpendicularly to the channels 34 of the fin unit 30, i.e., a flowing direction of the airflow at the air inlet 48 and the air outlet 46 being parallel to the channels 34 of the fin unit 30. The electronic component 50 is located facing the air inlet 48 and adjacent to the transverse fan 40; the electronic component 50 is therefore in the flowing passage of the airflow flowing into the air inlet 48 and through the transverse fan 40; thus, the airflow of the transverse fan 40 can cool the electronic component 50 directly.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device, comprising:
a casing defining a space therein;
an electronic component disposed in the space of the casing; and
a thermal module comprising a heat pipe, a fin unit, and a transverse fan, the heat pipe comprising an evaporating section thermally attached to the electronic component to absorb heat from the electronic component during operation of the electronic component, and a condensing section thermally attached to the fin unit to dissipate the heat absorbed from the electronic component to the fin unit, the transverse fan being arranged in the casing and configured for generating an airflow to take away the heat of the fin unit, the transverse fan comprising a rotor, and a sidewall located on a floor of the casing and surrounding the rotor, the sidewall defining an air inlet and an air outlet therein, the air outlet facing toward the fin unit, the air inlet facing toward the electronic component, wherein the transverse fan further comprises a cover arranged on a top end of the sidewall for supporting the rotor, the cover abutting a roof of the casing.

2. The portable electronic device of claim 1, wherein the fin unit comprises a plurality of parallel fins, and a channel is defined between each two neighboring fins, the air inlet and the air outlet being substantially perpendicular to the channels of the fin unit.

3. The portable electronic device of claim 2, wherein the electronic component is arranged adjacent to the air inlet of the transverse fan, and is located in a flowing passage of the airflow flowing into the air inlet of the transverse fan.

4. The portable electronic device of claim 1, wherein the air inlet and the air outlet extend through the sidewall, dividing the sidewall into two spaced parts.

5. The portable electronic device of claim 1, wherein a central axis of the transverse fan is perpendicular to the floor of the casing.

6. The portable electronic device of claim 1, wherein the rotor comprises a hub, a plurality of ribs extending outwardly and radially from the hub, a first inner ring surrounding and connecting outer ends of the ribs, a plurality of blades extending outwardly from the first inner ring, and a first outer ring surrounding and connecting outer ends of the blades.

7. The portable electronic device of claim 6, wherein the first inner ring is located at bottom sides of the blades.

8. The portable electronic device of claim 7, further comprising a second inner ring connecting top sides of inner ends of the blades together, and a second outer ring surrounding and connecting the outer ends of the blades, the first and second outer rings being located at bottom and top sides of the outer ends of the blades, respectively.

9. The portable electronic device of claim 1, wherein a plurality of through holes are defined in the casing, and the fin unit is located between the through holes of the casing and the air outlet of the transverse fan.

10. A thermal module, comprising:
a heat pipe comprising an evaporating section being configured for thermally attaching to an electronic component to absorb heat therefrom and a condensing section;
a fin unit thermally attached to the condensing section of the heat pipe to absorb heat from the condensing section of the heat pipe; and
a transverse fan for generating airflow to take away the heat of the fin unit, the transverse fan comprising a rotor, and a sidewall surrounding the rotor, the sidewall defining an air inlet and an air outlet therein, the air outlet facing toward the fin unit, wherein the rotor comprises a hub, a plurality of blades surrounding the hub, a pair of inner rings connecting top and bottom sides of inner ends of the blades together, respectively, a pair of outer rings connecting top and bottom sides of outer ends of the blades together, respectively, and a plurality of ribs extending outwardly and radially from the hub to connect with one of the inner rings.

11. The thermal module of claim 10, wherein the fin unit comprises a plurality of parallel fins, and a channel is defined between each two neighboring fins, the air inlet and the air outlet being substantially perpendicular to the channels of the fin unit.

12. The thermal module of claim 11, wherein a central axis of the transverse fan is parallel to the fins.

13. The thermal module of claim 10, wherein the transverse fan further comprises a cover arranged on a top end of the sidewall for supporting the rotor, the air inlet and the air outlet extend through the sidewall, dividing the sidewall into two spaced parts.

14. A portable electronic device, comprising:

a casing defining a space therein;

an electronic component disposed in the space of the casing; and a thermal module comprising a heat pipe, a fin unit, and a transverse fan, the heat pipe comprising an evaporating section thermally attached to the electronic component to absorb heat from the electronic component during operation of the electronic component, and a condensing section thermally attached to the fin unit to dissipate the heat absorbed from the electronic component to the fin unit, the transverse fan being arranged in the casing and configured for generating an airflow to take away the heat of the fin unit, the transverse fan comprising a rotor, and a sidewall located on a floor of the casing and surrounding the rotor, the sidewall defining an air inlet and an air outlet therein, the air outlet facing toward the fin unit, the air inlet facing toward the electronic component, wherein the rotor comprises a hub, a plurality of ribs extending outwardly and radially from the hub, a first inner ring surrounding and connecting outer ends of the ribs, a plurality of blades extending outwardly from the first inner ring, and a first outer ring surrounding and connecting outer ends of the blades.

15. The portable electronic device of claim 14, wherein the first inner ring is located at bottom sides of the blades.

16. The portable electronic device of claim 15, further comprising a second inner ring connecting top sides of inner ends of the blades together, and a second outer ring surrounding and connecting the outer ends of the blades, the first and second outer rings being located at bottom and top sides of the outer ends of the blades, respectively.

17. The portable electronic device of claim 14, wherein the fin unit comprises a plurality of parallel fins, and a channel is defined between each two neighboring fins, the air inlet and the air outlet being substantially perpendicular to the channels of the fin unit.

18. The portable electronic device of claim 17, wherein the electronic component is arranged adjacent to the air inlet of the transverse fan, and is located in a flowing passage of the airflow flowing into the air inlet of the transverse fan.

19. The portable electronic device of claim 14, wherein the transverse fan further comprises a cover arranged on a top end of the sidewall for supporting the rotor, the cover abutting a roof of the casing.

20. The portable electronic device of claim 14, wherein the air inlet and the air outlet extend through the sidewall, dividing the sidewall into two spaced parts.

* * * * *

UNITED STATES PATENT AND TRADEMARK OFFICE
CERTIFICATE OF CORRECTION

PATENT NO.        : 7,688,579 B2                                      Page 1 of 1
APPLICATION NO. : 12/235607
DATED             : March 30, 2010
INVENTOR(S)       : Ching-Bai Hwang, Zhi-Hui Zhao and Ran Lin It is certified that error appears in the above-identified patent and that said Letters Patent is hereby corrected as shown below:

Title Page, Item (30) "Foreign Application Priority Data should read as follows:

-- (30)    Foreign Application Priority Data

Apr. 28, 2008   (CN).........................2008 1 0066872 --.

Signed and Sealed this

Twenty-first Day of December, 2010

David J. Kappos
*Director of the United States Patent and Trademark Office*